May 21, 1935.  R. MAYNE  2,002,377
RESILIENT CONNECTER
Filed June 20, 1932
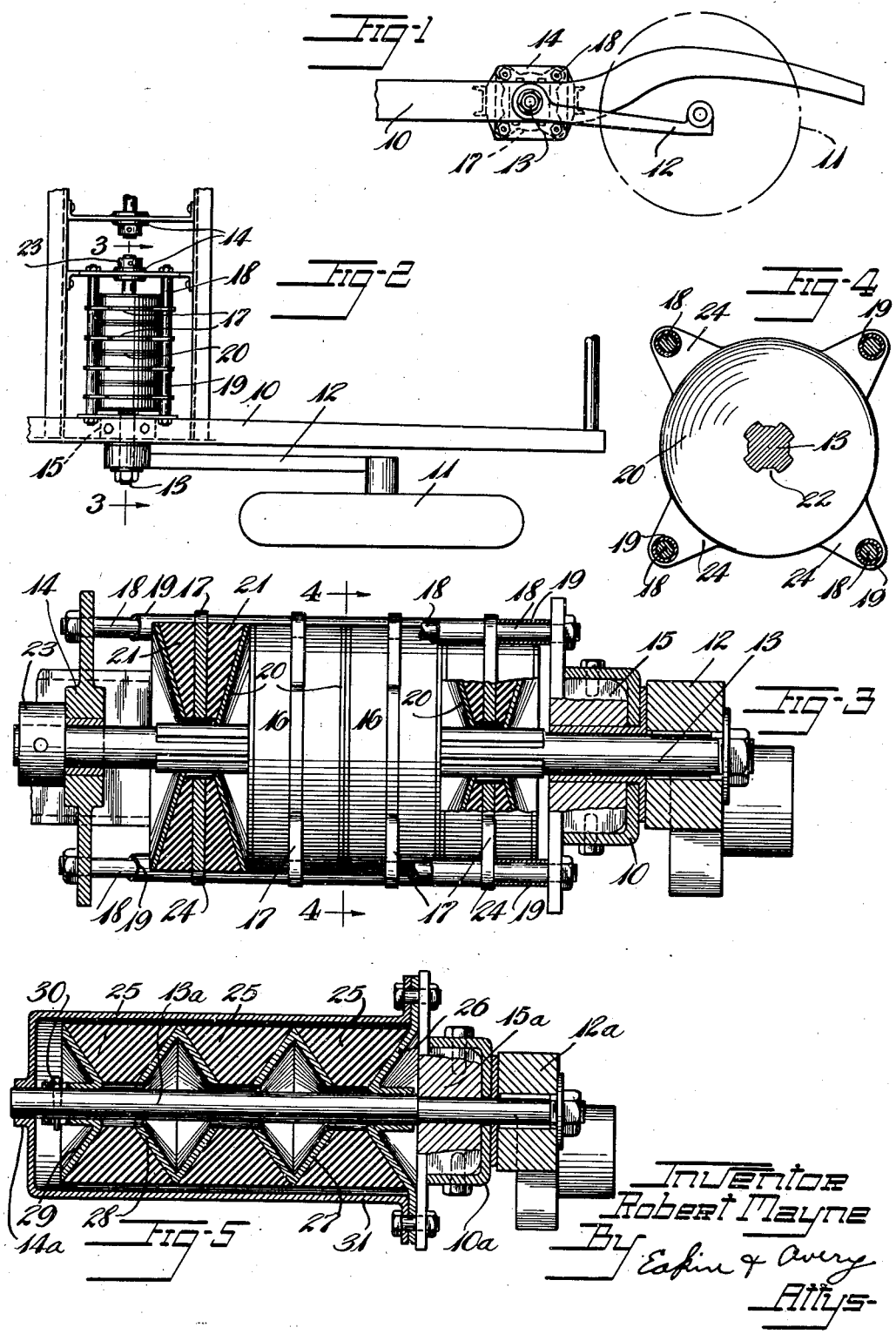

Patented May 21, 1935

2,002,377

UNITED STATES PATENT OFFICE 2,002,377

RESILIENT CONNECTER

Robert Mayne, Akron, Ohio, assignor to The B. F. Goodrich Company, New York, N. Y., a corporation of New York Application June 20, 1932, Serial No. 618,285

8 Claims. (Cl. 267—21)

This invention relates to resilient connecters, and more particularly to connecters in which relative rotation of the connected parts is resisted by the resilient material.

The chief objects of the invention are to provide an improved connecter, to provide facility of manufacture, to provide with compactness and ruggedness of structure a connecter that is especially well suited for operation under heavy loads and throughout a large range of displacement, and especially to provide a connecter in which relative rotative movement of the parts is resisted by the resilient material with substantial uniformity of stress in the material at different distances from the axis of rotation, so that the load will be well distributed in the resisting material and localized overstraining will be avoided. Another object is to provide a connecter that is especially well suited for use as a vehicle wheel mounting in substitution of metal springs.

These and further objects will be apparent from the following description, reference being had to the accompanying drawing, in which:

Fig. 1 is an elevation, with parts broken away, of a vehicle frame member and in association therewith a resilient wheel mounting constructed according to and embodying the invention in its preferred form.

Fig. 2 is a plan view with parts broken away of the structure of Fig. 1.

Fig. 3 is an enlarged view on line 3—3 of Fig. 2, with parts broken away and in section.

Fig. 4 is a section on line 4—4 of Fig. 3.

Fig. 5 is a view similar to that of Fig. 3 but showing a modified construction.

The invention is illustrated as applied to an independent wheel mounting for a vehicle, but, although the invention is especially well suited for such use it will be understood that the field of utility is not so limited, the invention being applicable to resilient connections generally.

As the mounting structure may be duplicated for each wheel only one need be described.

Referring to the drawing, 10 is a vehicle chassis frame member at one end of which is a wheel 11 mounted for rotation upon the free end of an arm 12, the latter, preferably positioned outside of the vehicle frame, being secured to the outer end of a rotatable shaft 13 which projects from a resilient support mounted upon the chassis frame.

The shaft 13 is disposed transversely of the chassis and is preferably journaled in spaced inner and outer bearings 14 and 15 suitably supported in the frame and adapted to resist misalignment of the shaft without substantially resisting its rotative movement. Positioned along the shaft between these bearings are a plurality of resilient units 16, 16 in a number suitable to the torsional resistance desired, there being four such units shown in the illustrated embodiment.

Each unit 16 comprises a middle plate 17, centrally apertured for free relative rotation of the shaft 13, and these plates are secured to the chassis frame, as by means of bolts or rods 18, 18 extending through apertured ears 24, 24 formed on the plates 17 and through parts of the chassis frame, spacer sleeves 19, 19 being provided between the ears of adjacent plates. On each side of each of the plates 17, in axially spaced relation thereto, is a plate 20, preferably of dished form as shown, which is secured against relative rotation upon the shaft 13 and on each side of the plate 17, between it and the adjacent plate 20, is a resilient cushion 21, arranged to resist resiliently angular movement of the plates 20 with relation to the plate 17 and thus to resist movement of the arm and wheel with relation to the chassis.

The resilient cushions 21, 21 preferably are in the form of annular pads of rubber secured to the plate faces in any suitable manner, preferably by surface adhesion, but they may be held against slippage on the plates by being mounted under compression between the plates in which latter case the plates 20, 20 are of course secured against axial movement on the shaft in order to maintain the compression, whereas, when the cushions 21 are secured by surface adhesion the plates 20 preferably are splined on the shaft, the splines being shown at 22, 22 in Figs. 3 and 4, to permit such axial yielding of the plates 20 with relation to the shaft as may be desirable because of the angular distortion of the rubber under angular displacement of the shaft plates 20.

Undesirable axial movement of the shaft 13 may be prevented at the outer end of the shaft by abutment of the hub portion of arm 12 and at the inner end of the shaft by means of a thrust collar 23 in abutting association with the frame structure. Suitable anti-friction thrust bearings (not shown) may be employed at these points if desired.

It will be seen that the construction is such that each cushion has substantially the same area of contact with the plate 17 as with the plate 20 so that its resistance to sliding may be the same as to both, as distinguished from the case of the unequal bonded areas in the heretofore proposed type of torsional connecter comprising concentric, cylindrical sleeve elements having intervening rubber bonded to their opposed surfaces of unequal area. In the latter type, moreover, the bonded areas are merely proportional to their distance from the axis of rotation, whereas in the improved construction the bonded area varies as to the difference between the squares of the inner and outer radii of the rubber cushion, thus providing greater strength against slippage in a desirable range of dimensions.

Provision is made for substantial uniformity of stress at radially spaced zones of the rubber, particularly of shearing stress along the radial extent of the plate faces in adhesion with the rubber, despite the fact that under angular movements of each of the movable plates the circumferential distance traversed by a zone at the outer periphery of the plate face is greater than that of the zones inwardly thereof, which condition, if the opposed plate faces were parallel, would result in considerably greater stresses in the rubber at the outer peripheral zones than at the inner zones.

For this purpose each of the plates 20, 20 is constructed and arranged with its inner face oblique to the shaft 13, the arrangement being such that the axial thickness of the rubber between the opposed faces of plates 20 and 17 is graduated increasingly outward substantially in accordance with the graduation in the amount of displacement occurring during angular movement of the shaft, so that the stresses at the bonded surfaces of the rubber are substantially uniform throughout, and so that the maximum strength is provided.

The desired arrangement may be had with a substantially frusto-conical shape of either one or both of the opposed plate faces. In the embodiment of Fig. 3, instead of providing the two movable plates of each unit with frusto-conical faces and the central, fixed plate with flat faces, as shown, the fixed plate may be made frusto-conical and the movable plate made either flat or frusto-conical to provide the desired graduation of thickness of the rubber.

An arrangement in which both of the opposed plate faces are frusto-conical is shown in the modification of Fig. 5. This construction conveniently permits a greater degree of divergence to the opposed faces, and a corresponding increase in the angle of rotation is made possible for a given radial dimension of the connecter, by virtue of the greater variation of the axial thickness of the rubber.

Referring to Fig. 5, in which angular displacements of greater range are provided for by a series arrangement of the resilient units, as distinguished from the arrangement of the units in parallel as in Fig. 3, a plurality of the rubber cushions 25, 25, disposed in axial alignment along the operating shaft 13a, are bonded, as by vulcanized adhesion, to the opposed faces of a plurality of annular, frusto-conical plate elements 26, 27, 28 and 29. The outer plate element 26, only, is rigidly secured to the chassis frame, as shown, and all the plate elements, excepting the innermost element 29, permit free relative rotation of the shaft, the innermost element 29 being mounted upon the shaft for rotation with the shaft, preferably by such means as the pin and slot connection 30, which permits axial yielding of the plate element under angular distortion of the rubber.

For strength of the mounting the shaft may be supported in inner and outer bearings 14a and 15a mounted in the chassis frame 10a, and if desired, the connecter may be enclosed in a casing or cage structure 31.

In this embodiment the respective angular displacements permitted by the cushions are additive so that the total of the cumulative displacements is available where a large range of movement of the arm 12a is desired.

As to both embodiments, manufacture is facilitated where it is desired to provide vulcanized adhesion of the rubber to the plate faces, the construction permitting the heating and also the cooling of the rubber under pressure of the plates against it without the objectionable weakening of the adhesion by pulling of the rubber away from the plate faces under shrinkage that is frequently encountered in the manufacture of connecters of the concentric, cylindrical sleeve type where the plates cannot yield toward each other.

Variations may be made without departing from the scope of the invention as it is hereinafter claimed.

I claim:

1. A resilient connecter comprising three rigid members, one of which is disposed between the other two and each of which is mounted for relative rotation with respect to the other two and cushions of resilient material mounted between the intermediate member and the two outer members and resisting such movement, the central of the three rigid members being a plate-like member and the outer members having faces diverging in the radially outward direction with respect to the faces of the central member, the said resilient material sustaining substantially the entire strain of such movement by engagement with the faces of said members.

2. A resilient connecter for a pair of elements adapted for movement of one with relation to the other comprising, in combination, a plurality of rigid members having pairs of non-cylindrical surfaces of revolution, said members being mounted for rotative movement of one of the said surfaces of each pair with relation to the other surface of the pair and with relation to both of the connected elements upon movement of one of the connected elements with relation to the other and with said surfaces extending in the direction of the rotative movement, and cushions of resilient material mounted between the members to resist such movement, the said resilient material sustaining substantially the entire strain of such movement by engagement with the said non-cylindrical surfaces of the rigid members, and the cushions being of such gradually increasing thickness radially outward as to cause the resilient material to be stressed with substantial uniformity over its radial extent during the relative movement of the rigid members.

3. A resilient connecter comprising a shaft, bearing means for said shaft resisting mis-alignment of it while permitting its rotative movement, a pair of rigid members having non-cylindrical surfaces of revolution extending in the direction of the rotative movement and being mounted for rotative movement of one with relation to the other upon rotative movement of the shaft, one of the rigid members being mounted for compulsory rotative movement with the shaft and for axial movement with relation thereto, and a cushion of resilient material mounted between the rigid members to resist such movement, the said resilient material sustaining substantially the entire strain of such movement by non-slipping engagement with said non-cylindrical surfaces of revolution.

4. A resilient connecter comprising three rigid members, one of which is disposed between the other two, and each of which is mounted for relative rotation with respect to the other two, and cushions of resilient material mounted between the intermediate member and the two outer members and resisting such movement, the said resilient material sustaining substantially the entire strain of such movement by engagement with non-cylindrical surfaces of revolution on the members extending in the direction of the movement.

5. A resilient connecter for a pair of elements adapted for movement of one with relation to the other comprising, in combination, a shaft mounted for compulsory rotative movement with one of said elements, a plurality of members having pairs of non-cylindrical surfaces of revolution disposed about said shaft, said members being mounted for rotative movement of one of the surfaces of each pair with relation to the other surface of the pair and with relation to the shaft and for compulsory rotative movement and axial yielding movement of the other surface of each pair with relation to the shaft, and cushions of resilient material mounted between the members to resist the rotative movement, the said material sustaining substantially the entire strain of such movement by non-slipping engagement with the said non-cylindrical surfaces of the members.

6. A resilient connecter as defined in claim 5 in which the members providing the respective pairs of non-cylindrical surfaces and the cushions therefor are detachably mounted as units along the shaft.

7. A resilient connecter for a pair of elements adapted for movement of one with relation to the other comprising, in combination, a shaft mounted for cumpulsory rotative movement with one of the elements, a plurality of cushioning units detachably mounted along said shaft, each unit having members providing a pair of non-cylindrical surfaces of revolution disposed about said shaft, the members being mounted for rotative movement of one of the surfaces of the pair with relation to the other surface of the pair and for compulsory rotative movement of one of said surfaces with relation to the shaft, and each unit comprising a cushion of resilient material mounted between the members to resist the rotative movement, the said material sustaining substantially the entire strain of such movement by non-slipping engagement with the said non-cylindrical surfaces of the members.

8. A resilient connecter as defined in claim 7 in which each unit has an intermediate member and two side members providing between them two pairs of the non-cylindrical surfaces, and rubber cushions between the pairs of surfaces and bonded to them by vulcanization.

ROBERT MAYNE.